(12) United States Patent
Izumi (10) Patent No.: US 10,814,424 B2
(45) Date of Patent: Oct. 27, 2020

(54) LASER MACHINING HEAD HAVING FUNCTION OF RECTIFYING ASSIST GAS

(71) Applicant: Fanuc Corporation, Minamitsuru-gun, Yamanashi (JP)

(72) Inventor: Takashi Izumi, Yamanashi (JP)

(73) Assignee: Fanuc Corporation, Yamanashi (JP)

(*) Notice: Subject to any disclaimer, the term of this patent is extended or adjusted under 35 U.S.C. 154(b) by 1 day.

(21) Appl. No.: 16/263,566

(22) Filed: Jan. 31, 2019

(65) Prior Publication Data
US 2019/0255652 A1 Aug. 22, 2019

(30) Foreign Application Priority Data
Feb. 16, 2018 (JP) .................................. 2018-026089

(51) Int. Cl.
*B23K 26/00* (2014.01)
*B23K 26/14* (2014.01)
*B23K 26/06* (2014.01)
*B23K 26/04* (2014.01)
*B23K 26/70* (2014.01)

(52) U.S. Cl.
CPC .......... *B23K 26/1437* (2015.10); *B23K 26/04* (2013.01); *B23K 26/06* (2013.01); *B23K 26/0648* (2013.01); *B23K 26/14* (2013.01); *B23K 26/1438* (2015.10); *B23K 26/1476* (2013.01); *B23K 26/706* (2015.10)

(58) Field of Classification Search
CPC .... B23K 26/04; B23K 26/06; B23K 26/0648; B23K 26/14; B23K 26/1437; B23K 26/1438; B23K 26/1476; B23K 26/706
USPC .......................................... 219/121.6–121.86
See application file for complete search history.

(56) References Cited

U.S. PATENT DOCUMENTS

| 3,569,660 | A | * | 3/1971 | Houldcroft | .......... | B23K 26/147 |
| | | | | | | 219/121.68 |
| 5,239,552 | A | * | 8/1993 | Okuyama | .......... | B23K 26/1476 |
| | | | | | | 372/58 |
| 6,791,061 | B2 | | 9/2004 | Fujii et al. | | |
| 2012/0037604 | A1 | * | 2/2012 | Shikata | .................. | G02B 7/008 |
| | | | | | | 219/121.67 |
| 2017/0259377 | A1 | * | 9/2017 | Ohno | .................... | B23K 26/144 |

FOREIGN PATENT DOCUMENTS

| CN | 1106329 A | 8/1995 |
| CN | 1394156 A | 1/2003 |
| JP | H05-228679 A | 9/1993 |
| JP | H06-066883 U | 9/1994 |
| JP | 07096381 A | 4/1995 |
| JP | H08-118063 A | 5/1996 |

(Continued)

*Primary Examiner* — Sang Y Paik
(74) *Attorney, Agent, or Firm* — RatnerPrestia (57) ABSTRACT

A laser machining head has a function of rectifying an assist gas and includes a protection window, a nozzle configured to blow the assist gas over a workpiece, a chamber defining a space between the protection window and the nozzle, an inflow port disposed in a chamber and configured to allow the assist gas to flow in, and a flow dividing projection disposed at a position opposing to the inflow port and configured to divide the assist gas from the inflow port into a first flow and a second flow flowing along a circumferential direction around an optical axis of a laser beam.

15 Claims, 6 Drawing Sheets

(56) References Cited

FOREIGN PATENT DOCUMENTS

| JP | 2011-088195 A | 5/2011 |
|----|---------------|--------|
| JP | 2004148360 A | 9/2017 |
| JP | 2017170477 A | 9/2017 |

\* cited by examiner

LASER MACHINING HEAD HAVING FUNCTION OF RECTIFYING ASSIST GAS

CROSS-REFERENCE TO RELATED APPLICATIONS

This application is a new U.S. Patent Application that claims benefit of Japanese Patent Application No. 2018-026089, filed Feb. 16, 2018, the disclosure of this application is being incorporated herein by reference in its entirety for all purposes.

BACKGROUND OF THE INVENTION

1. Field of the Invention

The present invention relates to a laser machining head, and particularly a laser machining head having a function of rectifying an assist gas.

2. Description of the Related Art

A laser machining device is configured such that an optical fiber or the like transmits a laser beam generated by a laser oscillator, the laser beam is focused by a condenser lens provided in a laser machining head on a workpiece, and thus the workpiece is irradiated with the laser beam. A protection window configured to protect the condenser lens from spatters, fumes, dust, or the like (hereinafter, simply referred to as dust) generated in machining the workpiece is provided between the condenser lens and the workpiece. The laser machining head also serves to blow an assist gas over the workpiece so that the assist gas blows molten members off. Accordingly, the laser machining head includes a nozzle including an outflow port of the assist gas at the leading end of the laser machining head.

Technologies described in the following documents are known as a technology related to the present application. JP H06-66883 UM-A discloses a laser machining nozzle including a helical projection configured to guide gas formed on an inner periphery of a nozzle to generate a swirl flow of the assist gas. This allows the swirl flow to be steadily generated in the nozzle. Although the effect on the surface of the workpiece is different between both sides in a traveling direction, since an assist nozzle configured to move in accordance with the movement of a main nozzle is further provided at the back in the traveling direction, these provide a good cross-sectional surface across the entire cut surface of the workpiece.

JP H08-118063 A discloses a laser machining device including an uneven surface (a helical groove, a groove having a female screw shape, an annular groove, a granular projection, or the like) in a nozzle hole. In the nozzle, the flow velocity distribution of the assist gas is optimized such that the flow velocity of the assist gas passing through the vicinity of the inner surface of the nozzle hole decreases, while the assist gas flows at high speed only at the center of the nozzle hole.

JP 2011-88195 A discloses a configuration in which a helical groove or the like is formed in the inner wall of a nozzle hole so that the assist gas is subjected to a rectifying effect. In the nozzle, the flowing gas is gradually gathered. This reduces a pressure loss at the tip and allows the assist gas to be smoothly injected through the nozzle hole.

JP H05-228679 A discloses a processing torch in which rectifying plates extending in a direction parallel to an optical axis are arranged to prevent a swirl flow from occurring in an assist gas blown from the tip of the processing torch. The processing torch provides a solution for the following problem. The assist gas strongly hits a surface at which a swirling direction of the assist gas and a cutting direction are the same, and this causes a dented cut surface. Furthermore, the assist gas weakly hits a surface opposite to the surface, and this insufficiently eliminates a molten workpiece.

SUMMARY OF THE INVENTION

In machining in which a high-pressure assist gas is blown over the workpiece, a non-uniform flow of the assist gas blown from the nozzle tip occurs, and the assist gas unevenly hits the workpiece. This causes poor quality of the laser machining. However, it is understood that the non-uniform flow of the assist gas at the nozzle tip is caused by the non-uniformity of pressure in the laser machining head, particularly in a chamber defining a space between the protection window and the nozzle.

Therefore, a technology is required in which before the assist gas is guided to the nozzle, the assist gas is rectified to make the flow of the assist gas blown from the nozzle tip uniform.

According to an aspect of the disclosure, a laser machining head has a function of rectifying an assist gas and includes a protection window, a nozzle configured to blow the assist gas over a workpiece, a chamber defining a space between the protection window and the nozzle, an inflow port disposed in a chamber and configured to allow the assist gas to flow in, and a flow dividing projection disposed at a position opposing to the inflow port and configured to divide the assist gas from the inflow port into a first flow and a second flow flowing along a circumferential direction around an optical axis of a laser beam.

DETAILED DESCRIPTION

The following describes detailed embodiments of the present disclosure with reference to the attached drawings.

In the drawings, identical or similar constituent elements are given identical or similar reference signs. The embodiments described below are not intended to limit the technical scope of the invention or the meaning of terms set forth in the claim. Note that terms "up" and "upstream" each indicate an upstream side of a path of a laser beam traveling in a forward direction, and terms "down" and "downstream" each indicate a downstream side of the path of the laser beam traveling in the forward direction.

Figure 1:
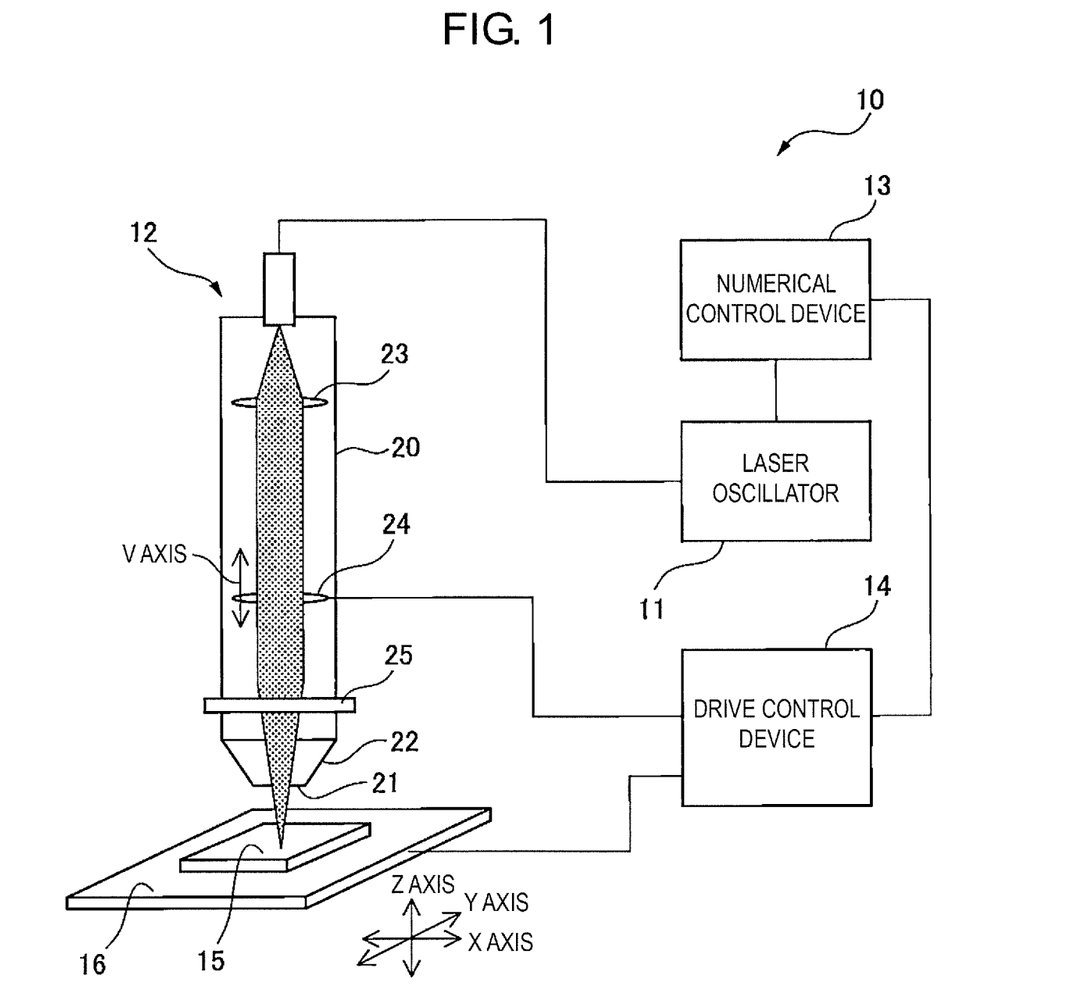
FIG. 1 is a schematic diagram illustrating the overall configuration of a laser machining device according to one embodiment.

FIG. 1 is a schematic diagram illustrating the overall configuration of a laser machining device 10 according to an embodiment. The laser machining device 10 includes a laser oscillator 11, a laser machining head 12 configured to guide a laser beam from the laser oscillator 11 and irradiate a workpiece 15 with the laser beam, a numerical control device 13 configured to control the entirety of the laser machining device 10, and a drive control device 14 configured to control the driving of a machining table 16 along an X axis, a Y axis, and a Z axis, and the driving of a condenser lens 24 along a V axis. The laser machining head 12 includes a head body 20 having a hollow cylindrical shape and a nozzle 22 connected to the head body 20 and configured to blow an assist gas over the workpiece 15 through an outflow port 21.

The head body 20 includes a collimation lens 23 for collimating a laser beam from the laser oscillator 11, the condenser lens 24 for focusing the laser beam on the workpiece 15, and a protection window 25 configured to protect the collimation lens 24 from drifting dust. The protection window 25 includes a glass member or the like, which is a surface-treated member and has a reflecting coating, and is configured to block a cavity defined by an inner wall of the head body 20 so that drifting dust does not adhere to the collimation lens 24. The protection window 25 is disposed perpendicularly to an optical axis of a laser beam; however, the protection window 25 may incline from the optical axis of the laser beam by 15 degrees or greater. This allows a collision angle of drifting dust flying toward the protection window 25 in laser machining to be shallow and can prevent the protection window 25 from getting stained.

Figure 2A:
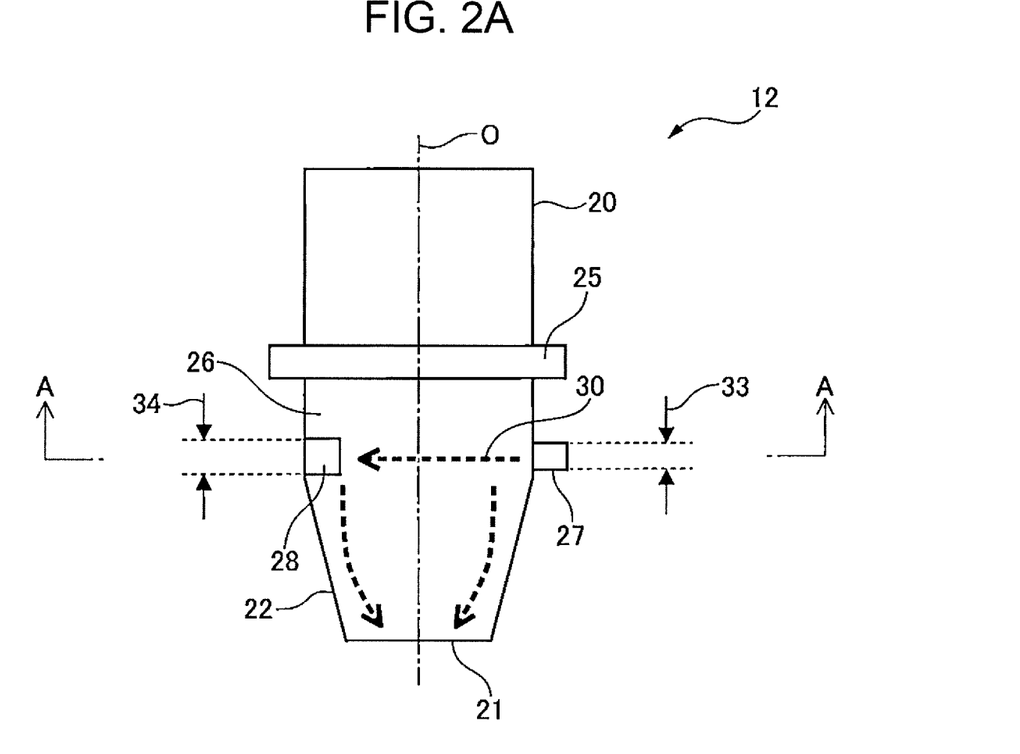
FIG. 2A is a vertical cross-sectional view of a laser machining head according to a first embodiment.

FIG. 2A is a vertical cross-sectional view of the laser machining head 12 according to the first embodiment. The laser machining head 12 further includes a chamber 26 defining a space between the protection window 25 and the nozzle 22, an inflow port 27 disposed in the chamber 26 and configured to allow the assist gas 30 to flow in the chamber 26, and a flow dividing projection 28 disposed at a position opposing to the inflow port 27. A direction of the assist gas at the inflow port 27 makes a right angle with a direction of the assist gas at the outflow port 21. The flow dividing projection 28 is provided at a position where the assist gas 30 hits an inner wall of the chamber 26 so that the turbulence occurs. This minimizes the turbulence of the assist gas 30.

Figure 2B:
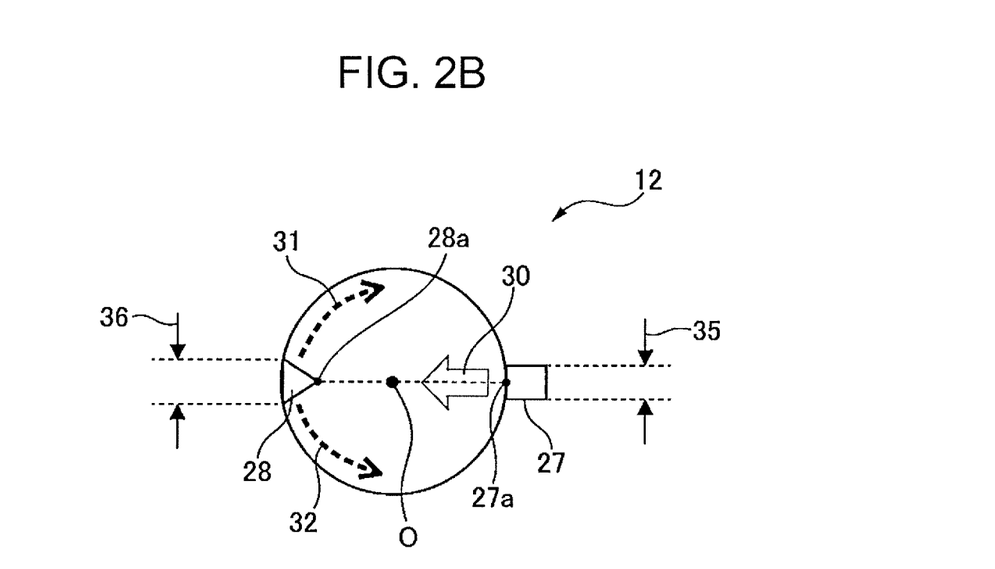
FIG. 2B is a horizontal cross-sectional view of a laser machining head corresponding to the cross-section A-A in FIG. 2A.

FIG. 2B is a horizontal cross-sectional view of the laser machining head 12 corresponding to the cross-section A-A in FIG. 2A. The flow dividing projection 28 has a tapered shape tapering toward the inflow port 27, for example, a shape of a triangular prism. The flow dividing projection 28 divides the flow of the assist gas 30 into a first flow 31 and a second flow 32 flowing along a circumferential direction around an optical axis O of the laser beam. Since the divided assist gases 30 return toward the inflow port 27, the pressure near the inflow port 27 does not decrease, and the non-uniformity of pressure in the chamber reduces. Furthermore, since a non-uniform flow of the assist gas blown from the nozzle tip is less likely to occur, the assist gas evenly hits the workpiece. This provides the laser machining with improved quality.

As illustrated in FIG. 2B, the center position 27a of the inflow port 27, the optical axis O of the laser beam, and the tip position 28a of the flow dividing projection 28 are preferably arranged in a straight line. This allows the flow dividing projection 28 to equally divide the flow of the assist gas 30 into right and left so that the flow ratio between the first flow 31 and the second flow 32 is 1:1 and can equalize the pressure in the chamber 26.

As illustrated in FIG. 2A, the inflow port 27 and the flow dividing projection 28 have first widths 33, 34 in a direction parallel to the optical axis O of the laser beam, respectively. The inflow port 27 and the flow dividing projection 28 are preferably formed such that the first width 33 of the inflow port 27 is less than the first width 34 of the flow dividing projection 28. This allows most of the assist gas 30 from the inflow port 27 to hit the flow dividing projection 28, which minimizes the turbulence in the chamber 26.

As illustrated in FIG. 2B, the inflow port 27 and the flow dividing projection 28 have second widths 35, 36 in a direction orthogonal to the optical axis O of the laser beam, respectively. The inflow port 27 and the flow dividing projection 28 are preferably formed such that the second width 35 of the inflow port 27 is less than the second width 36 of the flow dividing projection 28. This allows most of the assist gas 30 from the inflow port 27 to hit the flow dividing projection 28, which minimizes the turbulence in the chamber 26.

Figure 2C:
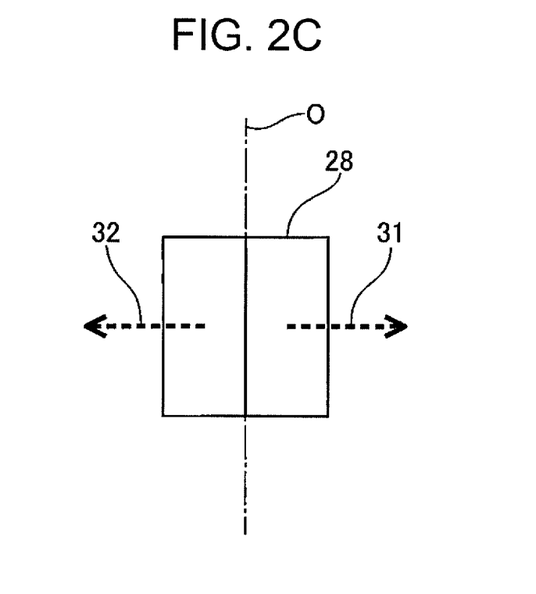
FIG. 2C is a front view illustrating a flow dividing projection viewed from an inflow port of an assist gas.

FIG. 2C is a front view of the flow dividing projection 28 viewed from the inflow port 27 of the assist gas. The flow dividing projection 28 has a triangular prism-like shape described above and divides the flow of the assist gas into flows in a circumferential direction perpendicular to the optical axis O of the laser beam, i.e., the first flow 31 flowing clockwise and the second flow 32 flowing counterclockwise. After the divided assist gases return toward the inflow port, the divided assist gases flow from the high-pressure chamber toward the low-pressure outflow port. An area ratio between two surfaces of the flow dividing projection 28 on which the assist gas in the first flow 31 and the assist gas in the second flow 32 hit, respectively, is preferably 1:1 so that the flow ratio between the first flow 31 and the second flow 32 is 1:1.

Figure 2D:
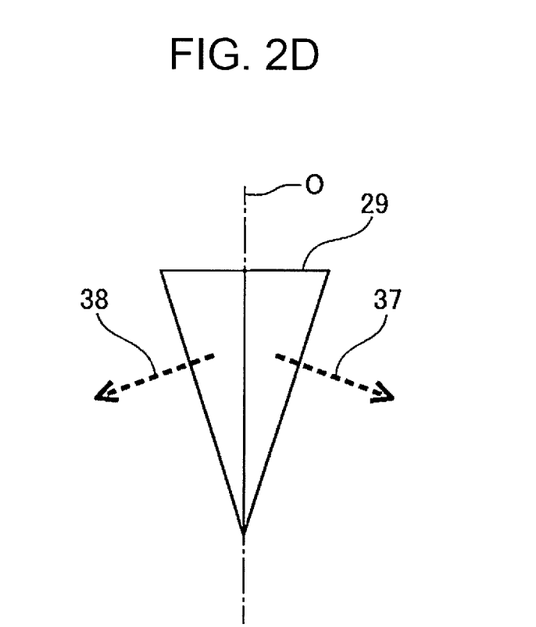
FIG. 2D is a front view illustrating a modified example of a flow dividing projection viewed from an inflow port of an assist gas.

FIG. 2D is a front view illustrating a modified example of a flow dividing projection 29 viewed from the inflow port 27 of the assist gas. The flow dividing projection 29 may have a tapered shape tapering toward the outflow port of the nozzle, for example, a shape of a triangular pyramid. The flow dividing projection 29 divides the flow of the assist gas into flows flowing in a circumferential direction around the optical axis O of the laser beam, i.e., a first flow 37 flowing downward and clockwise and a second flow 38 flowing downward and counterclockwise. The divided assist gases are rectified so as to flow downward, and this further minimizes the turbulence in the chamber 26. An area ratio between two surfaces of the flow dividing projection 29 on which the assist gas in the first flow 37 and the assist gas in the second flow 38 hit, respectively, is preferably 1:1 so that the flow ratio between the first flow 37 and the second flow 38 is 1:1.

Figure 2E:
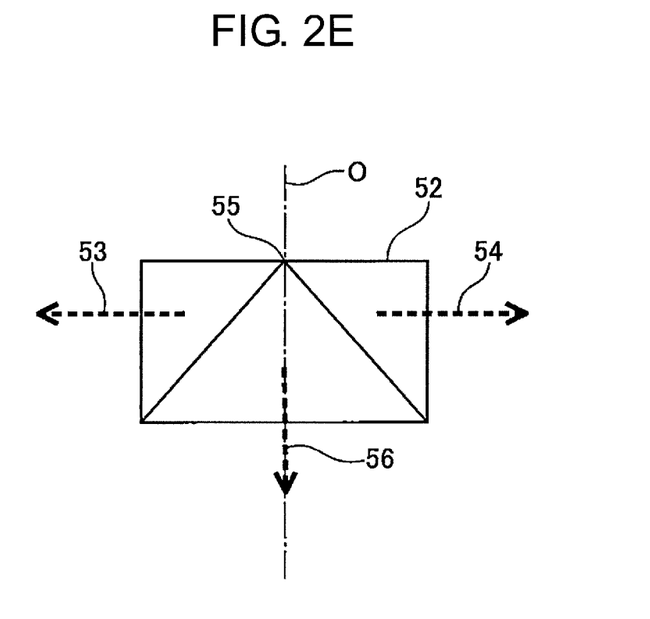
FIG. 2E is a front view illustrating a modified example of a flow dividing projection viewed from an inflow port of an assist gas.

FIG. 2E is a front view illustrating a modified example of a flow dividing projection 52 viewed from the inflow port 27 of the assist gas. The flow dividing projection 52 may have a tapered shape tapering toward the inflow port 27, for example, a shape of a quadrangular prism having a vertex 55 on an upstream side. The flow dividing projection 52 divides the flow of the assist gas into flows flowing in the circumferential direction around the optical axis O of the laser beam, i.e., a first flow 53 flowing clockwise and a second flow 54 flowing counterclockwise, and further into a ninth flow 56 flowing downward. The flow ratio among the first flow 53, the second flow 54, and the ninth flow 56 is preferably 1:1:2. An area ratio among three surfaces of the flow dividing projection 52 on which the assist gas in the first flow 53, the assist gas in the second flow 54, and the assist gas in the ninth flow 56 hit, respectively, is preferably 1:1:2 so that the flow ratio among the first flow 53, the second flow 54, and the ninth flow 56 is 1:1:2.

Figure 3A:
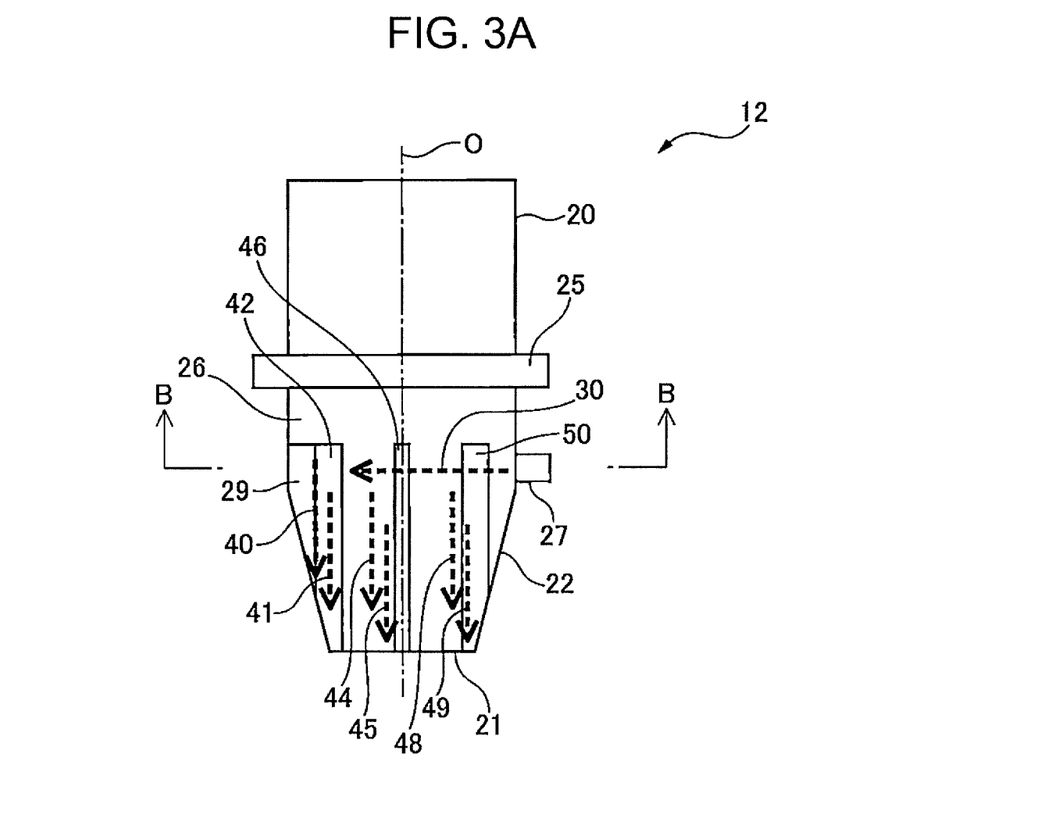
FIG. 3A is a vertical cross-sectional view of a laser machining head according to a second embodiment.
Figure 3B:
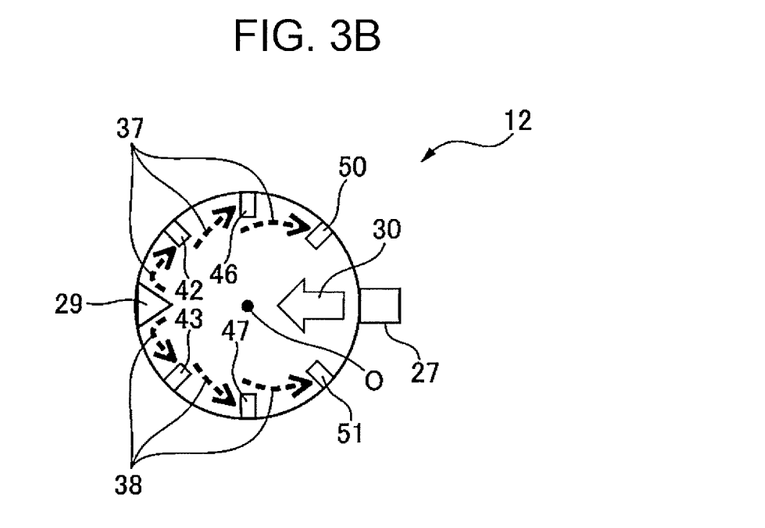
FIG. 3B is a horizontal cross-sectional view of a laser machining head corresponding to the cross-section B-B in FIG. 3A.

FIG. 3A is a vertical cross-sectional view of the laser machining head 12 according to the second embodiment. FIG. 3B is a horizontal cross-sectional view of the laser machining head corresponding to the cross-section B-B in FIG. 3A. Note that the following describes portions of the laser machining head different from those in the first embodiment, and a description for portions similar to those in the first embodiment is omitted. The laser machining head 12 according to the second embodiment includes, in addition to the flow dividing projection 29 described above, a first set of rectifying projections 42, 43 extending parallel to the optical axis O of the laser beam on both sides of the flow dividing projection 29 and configured to rectify at least a part of the first flow 37 and the second flow 38 to turn it toward the outflow port 21 of the nozzle 22 as a third flow 40 and a fourth flow 41. Furthermore, the laser machining head 12 includes a second set of rectifying projections 46, 47 disposed closer to the inflow port 27 than the first set of rectifying projections 42, 43, extending parallel to the optical axis O of the laser beam, and configured to rectify at least a part of the first flow 37 and the second flow 38 to turn it toward the outflow port 21 of the nozzle 22 as a fifth flow 44 and a sixth flow 45. Furthermore, the laser machining head 12 includes a third set of rectifying projections 50, 51 disposed closer to the inflow port 27 than the second set of rectifying projections 46, 47, extending parallel to the optical axis O of the laser beam, and configured to rectify at least a part of the first flow 37 and the second flow 38 to turn it toward the outflow port 21 of the nozzle 22 as a seventh flow 48 and an eighth flow 49.

As illustrated in FIG. 3A, the first set of rectifying projections 42, 43, the second set of rectifying projections 46, 47, and the third set of rectifying projections 50, 51 minimize the swirling of the assist gas 30 inside the laser machining head 12 and rectify the assist gas 30 to turn it straight toward the outflow port 21 of the nozzle 22. The assist gas blown from the nozzle 22 hits the workpiece almost perpendicularly, which prevents a pressure drop in the assist gas.

As illustrated in FIG. 3B, the first set of rectifying projections 42, 43, the second set of rectifying projections 46, 47, and the third set of rectifying projections 50, 51 are preferably circumferentially disposed around the optical axis O of the laser beam at equal intervals, for example, at every central angle of 45 degrees. This further reduces the non-uniformity of pressure in the laser machining head 12.

Figure 4A:
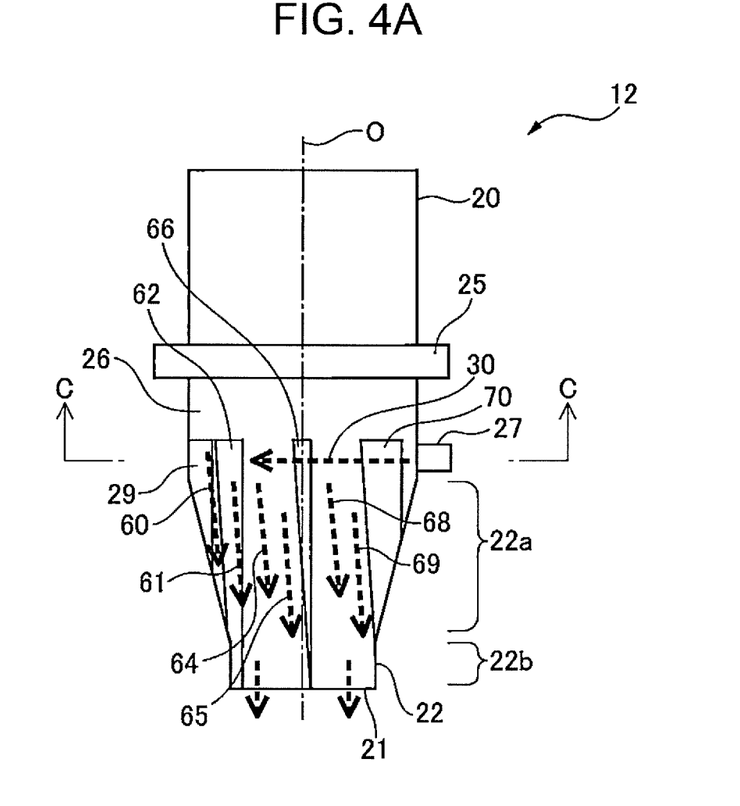
FIG. 4A is a vertical cross-sectional view of a laser machining head according to a third embodiment.
Figure 4B:
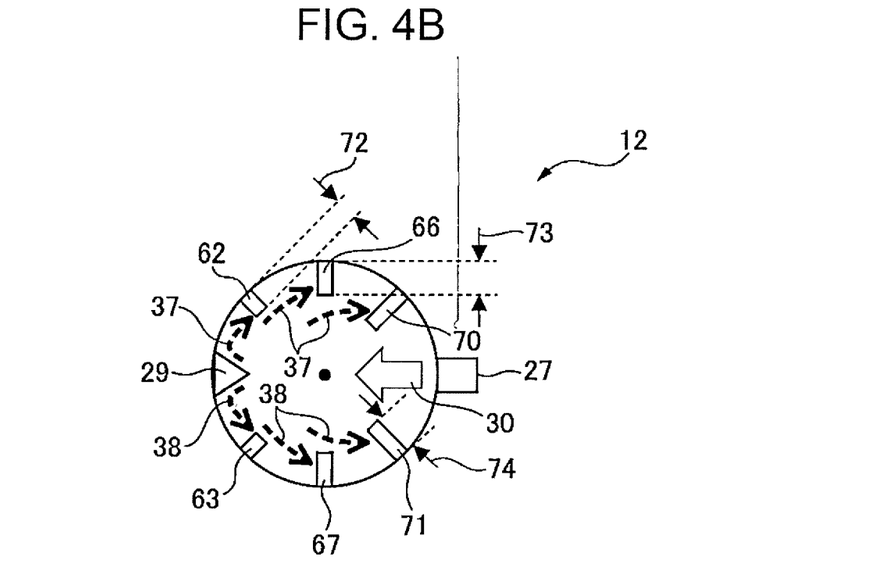
FIG. 4B is a horizontal cross-sectional view of a laser machining head corresponding to the cross-section C-C in FIG. 4A.

FIG. 4A is a vertical cross-sectional view of the laser machining head 12 according to the third embodiment. FIG. 4B is a horizontal cross-sectional view of the laser machining head corresponding to the cross-section C-C in FIG. 4A. Note that the following describes portions of the laser machining head different from those in the second embodiment, and a description for portions similar to those in the second embodiment is omitted. A first set of rectifying projections 62, 63, a second set of rectifying projections 66, 67, and a third set of rectifying projections 70, 71 according to the third embodiment have a tapered shape tapering toward the outflow port 21 of the nozzle 22, for example, a shape of a triangular prism. This allows the assist gas 30 to be rectified so that the flow of the assist gas 30 turns downward, which further minimizes the turbulence in the chamber 26.

As illustrated in FIG. 4B, the first set of rectifying projections 62, 63, the second set of rectifying projections 66, 67, and the third set of rectifying projections 70, 71 have third widths 72, 73, 74, respectively, in a direction toward the optical axis O of the laser beam. The third width 72 of the first set of rectifying projections 62, 63 is preferably less than the third width 73 of the second set of rectifying projections 66, 67. The third width 73 of the second set of rectifying projections 66, 67 is preferably less than the third width 74 of the third set of rectifying projections 70, 71. This provides the following advantage. That is, even in a case where the first flow 37 and the second flow 38 divided by the flow dividing projection 29 are not rectified by the first set of rectifying projections 62, 63, these are rectified by the second set of rectifying projections 66, 67. Furthermore, even in a case where the divided first flow 37 and the divided second flow 38 are not rectified by the second set of rectifying projections 66, 67, these are rectified by the third set of rectifying projections 70, 71. In other words, since the sum of flow amounts of the first flow 37 and the second flow 38 becomes equal to the sum of flow amounts from the third flow 60 to the eighth flow 69, the assist gas in the chamber 26 is further rectified.

As illustrated in FIG. 4A, the nozzle 22 includes a cone section 22a and a cylindrical section 22b connected to the cone section 22a. The outflow port 21 for the assist gas is preferably formed in the cylindrical section 22b. The cylindrical section 22b rectifies the assist gas such that the assist gas is straightly blown through the outflow port 21 of the nozzle 22, and the assist gas hits the workpiece almost perpendicularly. This provides laser machining with improved quality.

Note that, in the above embodiment, the diameter of the outflow port 21 of the assist gas is greater than the diameter of the inflow port 27 of the assist gas. However, in another embodiment, the diameter of the outflow port 21 of the assist gas is preferably less than the diameter of the inflow port 27 of the assist gas. This increases the pressure in the assist gas blown from the nozzle 22 and improves the force for blowing the molten workpiece off.

Since the laser machining head 12 described above includes the flow dividing projections 28, 29 formed at a position where the assist gas 30 hits the inner wall of the chamber 26 so that the turbulence occurs, the assist gas 30 is rectified in the circumferential direction around the optical axis O of the laser beam. The rectified assist gas 30 returns toward the inflow port 27, which prevents a pressure drop near the inflow port 27 and reduces the non-uniformity of the pressure in the chamber 26. Furthermore, since the non-uniform flow of the assist gas blown from the nozzle tip is less likely to occur, the assist gas evenly hits the workpiece. This provides the laser machining with improved quality.

Although some embodiments have been described in this specification, the present invention is not intended to be limited to the above-described embodiments, and it is to be understood that many changes can be made without departing from the scope of the appended claims.

The invention claimed is:

1. A laser machining head having a function of rectifying an assist gas comprising:

a protection window;
a nozzle configured to blow the assist gas over a workpiece;
a chamber defining a space between the protection window and the nozzle;
an inflow port disposed in the chamber and configured to allow the assist gas to flow in; and
a flow dividing projection disposed on an inner wall of the chamber opposing to the inflow port at a position beyond an optical axis of a laser beam and configured to divide a flow of the assist gas from the inflow port into a first flow and a second flow flowing along a circumferential direction around the optical axis of the laser beam.

2. The laser machining head of claim 1,
wherein the flow dividing projection has a tapered shape tapering toward the inflow port.

3. The laser machining head of claim 2,
wherein the flow dividing projection has a tapered shape tapering toward an outflow port of the nozzle.

4. The laser machining head of claim 1, further comprising:
a first set of rectifying projections disposed on both sides of the flow dividing projection, extending parallel to the optical axis of the laser beam, and configured to rectify at least a part of the first flow and the second flow to turn toward the outflow port of the nozzle as a third flow and a fourth flow.

5. The laser machining head of claim 4, further comprising:
a second set of rectifying projections disposed closer to the inflow port than the first set of rectifying projections, extending parallel to the optical axis of the laser beam, and configured to rectify at least a part of the first flow and the second flow to turn toward the outflow port of the nozzle as a fifth flow and a sixth flow.

6. The laser machining head of claim 5, further comprising:
a third set of rectifying projections disposed closer to the inflow port than the second set of rectifying projections, extending parallel to the optical axis of the laser beam, and configured to rectify at least a part of the first flow and the second flow to turn toward the outflow port of the nozzle as a seventh flow and an eighth flow.

7. The laser machining head of claim 6,
wherein the first set of rectifying projections, the second set of rectifying projections, and the third set of rectifying projections have a tapered shape tapering toward the outflow port of the nozzle.

8. The laser machining head of claim 6,
wherein the flow dividing projection has a shape of a quadrangular prism having a vertex on an upstream side and is configured to divide the assist gas further into a ninth flow flowing downstream, and
a flow ratio among the first flow, the second flow, and the ninth flow is 1:1:2.

9. The laser machining head of claim 6,
wherein the first set of rectifying projections, the second set of rectifying projections, and the third set of rectifying projections each have widths in a direction toward the optical axis of the laser beam,
the width of the first set of rectifying projections is less than the width of the second set of rectifying projections, and
the width of the second set of rectifying projections is less than the width of the third set of rectifying projections.

10. The laser machining head of claim 1,
wherein a flow ratio between the first flow and the second flow is 1:1.

11. The laser machining head of claim 1,
wherein the nozzle includes a cone section and a cylindrical section connected to the cone section, and
the outflow port of the assist gas is formed in the cylindrical section.

12. The laser machining head of claim 1,
wherein a center position of the inflow port, the optical axis of the laser beam, and a tip position of the flow dividing projection are arranged in a straight line.

13. The laser machining head of claim 1,
wherein the inflow port and the flow dividing projection each have first widths in a direction parallel to the optical axis of the laser beam and are formed such that the first width of the inflow port is less than the first width of the flow dividing projection.

14. The laser machining head of claim 13,
wherein the inflow port and the flow dividing projection each have second widths in a direction orthogonal to the optical axis of the laser beam and are formed such that the second width of the inflow port is less than the second width of the flow dividing projection.

15. The laser machining head of claim 1,
wherein a diameter of the outflow port of the assist gas is less than a diameter of the inflow port of the assist gas.

* * * * *